(12) United States Patent
Pickert

(10) Patent No.: US 6,374,940 B1
(45) Date of Patent: Apr. 23, 2002

(54) STEERING DEVICE FOR SELF-PROPELLED WORKING MACHINES

(75) Inventor: Heinrich Pickert, Rietberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/360,079

(22) Filed: Jul. 23, 1999

(30) Foreign Application Priority Data

Jul. 24, 1998 (DE) ............................ 198 33 383

(51) Int. Cl.$^7$ ................................ B62D 5/00
(52) U.S. Cl. ..................... 180/406; 180/405
(58) Field of Search ................... 180/403, 404, 180/405, 406, 402, 417, 421, 422, 442, 445, 6.3, 411, 414; 280/419

(56) References Cited

U.S. PATENT DOCUMENTS

| | | | | | |
|---|---|---|---|---|---|
| 3,730,288 A | * | 5/1973 | Dean | ........................ | 180/406 |
| 4,006,664 A | * | 2/1977 | Brown | ........................ | 91/171 |
| 4,130,177 A | * | 12/1978 | Goodbary et al. | .......... | 180/406 |
| 4,687,214 A | * | 8/1987 | Uno | ........................ | 280/91 |
| 4,723,475 A | * | 2/1988 | Burk | ........................ | 91/434 |
| 5,036,933 A | * | 8/1991 | Heinrich | ..................... | 180/140 |
| 5,092,419 A | * | 3/1992 | Leiber et al. | ................ | 180/140 |
| 5,249,639 A | * | 10/1993 | Marre et al. | ................ | 180/133 |
| 5,526,891 A | * | 6/1996 | Goloff | ........................ | 180/415 |
| 5,609,221 A | * | 3/1997 | Endsley et al. | ............. | 180/414 |

FOREIGN PATENT DOCUMENTS

| | | | | |
|---|---|---|---|---|
| EP | 0439370 B1 | 11/1994 | ............ | B62D/7/15 |
| JP | 403248965 A | * 11/1991 | | |
| WO | WO 96/01760 | 1/1996 | ............ | B62D/5/32 |

* cited by examiner

Primary Examiner—Brian L. Johnson
Assistant Examiner—Daniel Yeagley
(74) Attorney, Agent, or Firm—Husch & Eppenberger, LLC; Robert E. Muir

(57) ABSTRACT

A steering device for self-propelled working machines. Steering cylinders are associated with each pair of wheels and a fluid which is suppliable from a valve unit to the cylinders. At least one hydraulic pump is connected to the valve unit via hydraulic lines, and the valve unit includes a respective switching unit (16, 19) incorporating on-off valves (24, 25, 25') associated with each steering cylinder (8, 9). In the event of a fault, the on-off valves (24, 25, 25') are automatically switchable in a manner such that the steering cylinders (8, 9) can be controlled by a single steering control unit (18).

17 Claims, 8 Drawing Sheets

STEERING DEVICE FOR SELF-PROPELLED WORKING MACHINES

BACKGROUND OF THE INVENTION

The invention relates generally to a steering device for self-propelled working machines and more particularly to a steering device which includes a steering cylinder associated with a pair of wheels, a valve unit for controlling fluid flow to the cylinders, and a hydraulic pump which supplies fluid to the valve unit via hydraulic lines. The term "self-propelled working machines" is intended to include, inter alia, agricultural machines having steerable wheels, including combines and foragers, as well as tractors and other towing equipment.

A steering device for self-propelled working machines is known from EP 0 439 370 B1. This includes a steering control unit which comprises a number of electromagnetically actuatable directional control valves for setting up differing steering arrangements, for example, front wheel and all-wheel steering. A first control valve provides for switching between front wheel and all-wheel steering. A second control valve connected to the output of the first one permits two different types of all-wheel steering to be set. The steering control unit is connected to a hydraulic pump for making the fluid available. However, a disadvantage of the known steering device is that no measures are taken to maintain the maneuverability of the working machine should the power fail, the pump be defective, or some other type of defect occur.

For the purposes of ensuring that a working machine remains maneuverable in an emergency, i.e. in the event of damage, a steering device for self-propelled working machines is known from WO 96/01760 A1 wherein a steering control unit is connected to two hydraulic pumps. The fluid being conveyed from the respective hydraulic pumps is fed into a common hydraulic line before being supplied to the steering control unit. The hydraulic pumps are of different design such that, in normal operation, a first hydraulic pump having a higher throughput will initially be used, while the second hydraulic pump will only be switched in as a booster pump when the first hydraulic pump has reached its maximum possible throughput rate. If one of the pumps should fail, delivery of the fluid is continued by the other pump. Non-return valves built into the hydraulic lines prevent the fluid from flowing back into any damaged branch of the fluid-conveying line system. A disadvantage of this known steering device is that only damage occurring in a region of the fluid-conveying lines close to a respective hydraulic pump can be detected and thereby allow steering to be maintained.

SUMMARY OF THE INVENTION

An object of the invention is overcome one or more of the above-described disadvantages.

Another object is to develop a steering device for self-propelled working machines so that the working machine can be steered at any time.

In accordance with the present invention, a steering is provided, which includes at least one steering cylinder associated with at least one pair of wheels, a fluid supplied from a valve unit to all cylinders, and at least one hydraulic pump connected to the valve unit via hydraulic lines. The valve unit includes a respective switching unit incorporating at least one on-off valve associated with each steering cylinder. The on-off valves are automatically switchable in the event of a fault in a manner such that the steering cylinders may be controlled by a single steering control unit.

The special advantage of the invention lies in that the on-off valves of the switching units are designed such that they will automatically switch the steering device into a position in which the steering cylinders are connected to just a single one of the steering control units should damage occur, i.e. in the event of a fault. Preferably, a first switching unit is put into a blocking position in the event of a fault, while the on-off valves of a second switching unit are connected in a manner such that the fluid will be supplied to the steering cylinders in succession.

In accordance with one embodiment of the invention, the switching unit is arranged between the steering control unit and the steering cylinder associated therewith. Hence, should damage occur, it is ensured that the system will switch to a state wherein one of the hydraulic circuits together with any defective components therein can be completely switched out of service.

In another embodiment of the invention, the switching unit connected to the steering cylinders is connected, in the event of a fault, to a steering control unit comprising merely a hydraulic device so that a backup state will be obtained should damage occur. In this case, the steering cylinders are switched to an all-wheel steering mode by means of the on-off valves in the switching unit.

In accordance with one embodiment of the invention, the steering device consists of two hydraulic circuits of which one is associated with the steering cylinder of a hydraulic steering control unit for the front axle in the direction of travel while the other one is associated with the steering cylinder of an electro-hydraulic steering control unit for the back axle in the direction of travel. As a result of this arrangement, the steering cylinder associated with the back axle can be electrically controlled in a simple manner in correspondence with a steering program for the steering cylinder associated with the front axle. Due to the parallel control of the steering cylinders and the fact that one steering control unit can be controlled electrically, several forms, or types of steering can be implemented in a variable manner. In the event of a fault caused by a power failure, a defective pump or a defective control valve or any other sort of defect, steerage can be maintained by means of an all-wheel steering arrangement fed from a back-up pump by switching over to the hydraulic steering control unit.

In one embodiment of the invention, the on-off valves of the switching units are designed in the form of directly operated seat valves in a manner such that they can be moved into a predetermined position pertaining to the default state, without the supply of electrical energy.

In accordance with one embodiment of the invention, the on-off valves of the first and second switching unit can be switched together in a manner such that both the first steering cylinder and the second steering cylinder can be associated with the front axle or the back axle of the working machine. This arrangement permits the front axle to be controlled by a hydraulic valve so as to provide a preferred steering value, whereby the back axle will follow a certain steering program in dependence on this preferred steering value.

In a further embodiment of the invention, the emergency steering pump is in the form of a fixed displacement pump which is driven in dependence on the speed of travel of the working machine. This thereby enables the emergency steering pump to be of very simple construction.

In one embodiment of the invention, the steering cylinders are each controlled by an electromagnetically actuatable control valve, while a hydraulic device in the form of a preferred steering-angle generating device, which is operatively connected to a steering wheel, controls one or two of these control valves in accordance with a steering program. A steering characteristic corresponding to the purely hydraulic control of the steering cylinder i.e. a way of allowing the operator to have a feel for the steering is thereby produced.

Other advantages of the invention are apparent from the further dependent claims.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
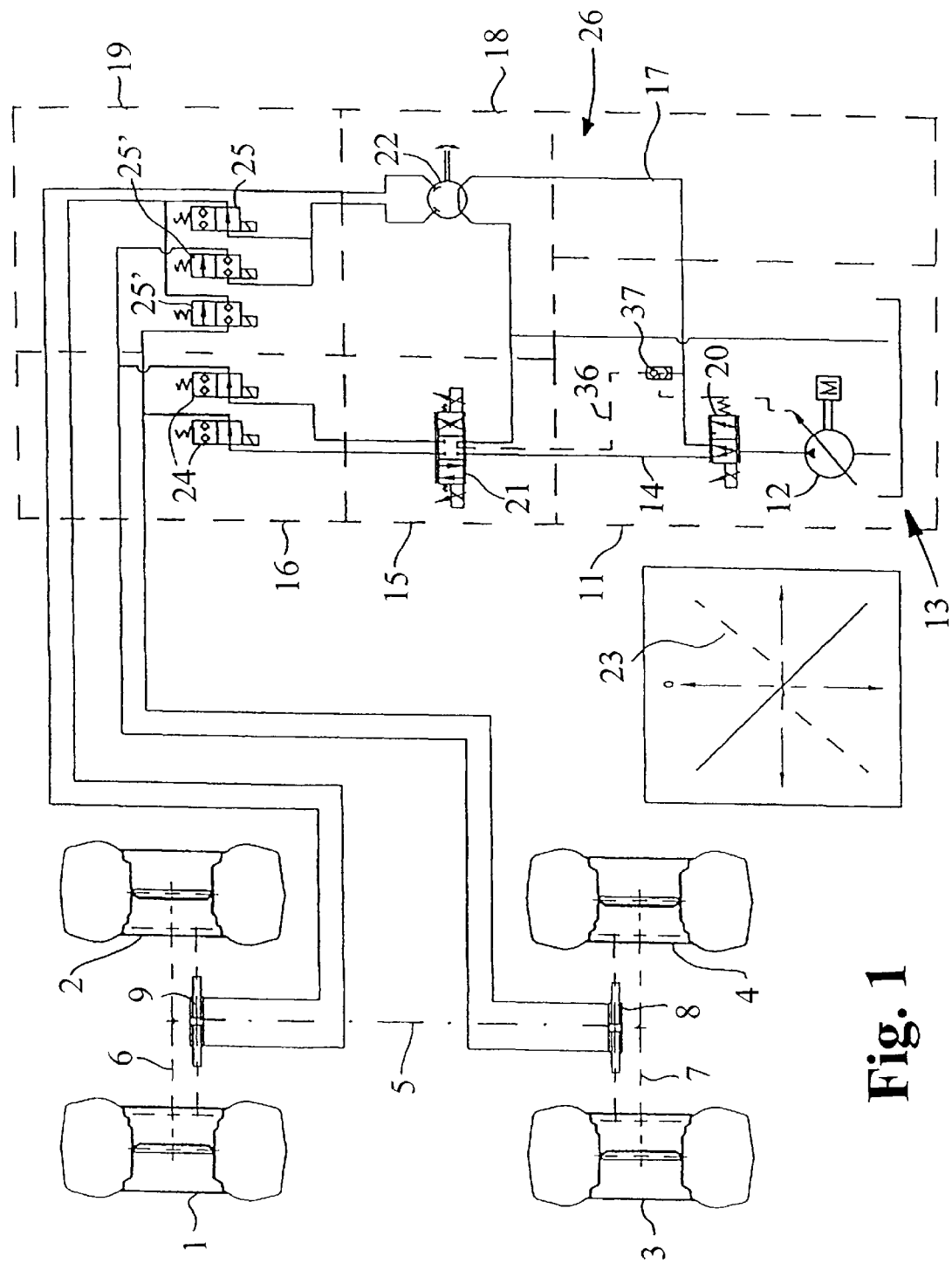
FIG. 1 is a schematic of a first embodiment of a steering device in the normal operational state.

As can be seen from FIG. 1, a working machine may have four wheels 1, 2, 3, 4 which are arranged in pairs at the ends of its longitudinal axis 5. For example, wheels 1 and 2 form a pair of wheels on a front axle 6, this being in the forward direction of travel, and wheels 3 and 4 forming a pair of wheels on the back axle 7. A first double-acting steering cylinder 8 is used for moving the wheels 3 and 4, while a second double-acting steering cylinder 9 is provided for moving the wheels 1 and 2. The steering cylinders 8 and 9 are connected via respective hydraulic lines to a valve unit. The valve unit consists of one or more steering control units and switching units. It is connected to a supply unit 11 which includes a hydraulic pump 12.

In the normal operational state of the steering device, the hydraulic pump 12 is connected via a first fluid-conveying line 14 to a first steering control unit 15 having a first switching unit 16 connected thereto, and to the first steering cylinder 8. This combination comprises a first hydraulic circuit 13. Furthermore, the hydraulic pump 12 is connected via a second fluid-conveying line 17 to a second steering control unit 18 having a second switching unit 19 attached thereto, and to the second steering cylinder 9. These comprise a second hydraulic circuit 26.

Figure 2:
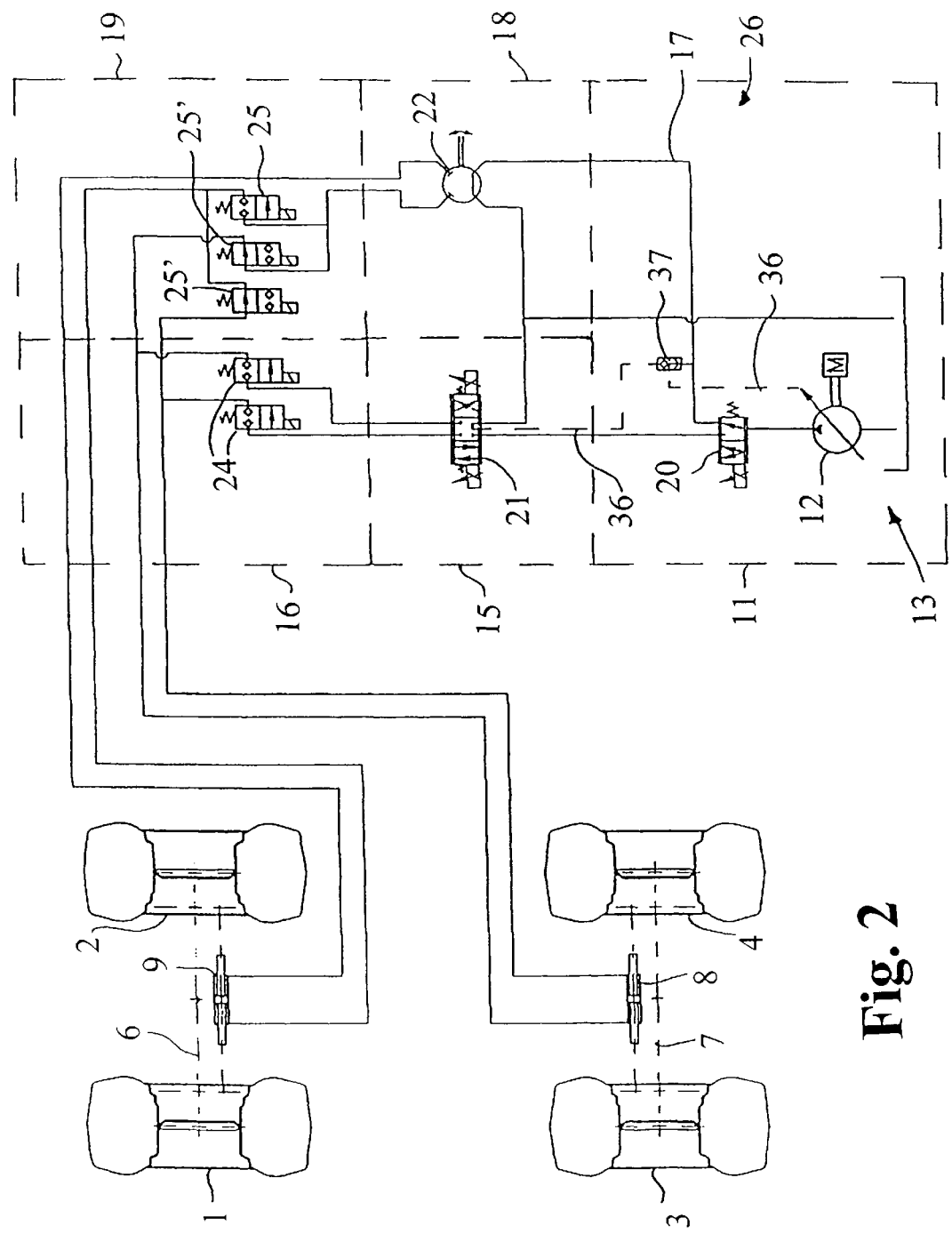
FIG. 2 is a schematic of the steering device of FIG. 1 in the event of a fault.

The supply unit 11 includes a control valve 20 which is connected to the output of the hydraulic pump 12 and supplies fluid to the two steering control units 15 and 18 in one operational position, while it merely allows the hyrdraulic control valve 20 to be connected to the second steering control unit 18 when it is in the default state, as is illustrated in FIG. 2.

The first steering control unit 1consists of an electromagnetically actuatable flow control valve 21 which is preferably in the form of a proportional valve. The second steering control unit 18 comprises a hydraulic device 22 which is operatively connected to a not-shown steering wheel and is effective to provide a steering angle for the front axle 6 in correspondence with the full-line characteristic curve illustrated in FIG. 1. The steering cylinder 8 of the back axle 7 is controlled by means of the valve 21 in correspondence with the dashed-line characteristic curve shown in the diagram. One of several steering programs for electro-hydraulically steering the back axle 7 can be selected here. For example, one available choice is provided by the characteristic curve 23 "travel on a highway" whereby a movement of the front axle 6 in one turning direction causes a movement of the back axle 7 in the opposite turning direction. In addition to the provision of several steering programs and the selective steering of the front axle 6 or the back axle 7 in isolation from the other, it is also possible to set up an all-wheel steering process which, in one case, allows the front axle 6 and the back axle 7 to be set in parallel (crab steering) or, in another case corresponding to the characteristic line, a tight steering process which results in a very small turning circle for the working machine.

The switching units 16 and 19 comprise respective on-off valves 24 and 25 each of which can adopt two different positions. In the normal operational state of FIG. 1, the two on-off valves 24 of the first switching unit 16 are in the throughflow position. The second switching unit 19 comprises three on-off valves 25, 25', of which a first on-off valve 25 is in the throughflow position while the other two on-off valves 25' are in the blocked position. The first on-off valve 25 in the throughflow position is connectable to the hydraulic valve 22 and is also connectable via hydraulic lines to the second steering cylinder 9 and to the further on-off valve 25'. A further on-off valve 25' in the blocked position is connected to the hydraulic valve 22 and is also connected to the first steering cylinder 8. The third on-off valve 25' in the blocked position is connected to the other termination of the first steering cylinder 8 and is also connected to the first on-off valve 25 in the throughflow position.

In the event of damage, i.e. in the default state of the steering device, the on-off valves 24 and 25, 25' switch automatically into a second position in correspondence with FIG. 2. The on-off valves 24, 25, 25' are in the form of electromagnetically actuatable 2/2 port valves which can be switched to the position shown in FIG. 2 by means of a return spring. Thus, the switch-over action is effected without a supply of electrical energy so as to ensure that the steering device is in a backup state in the event of a fault.

As is apparent from FIG. 2, the on-off valves 24 of the first switching unit 16 are in the blocked position while the on-off valve 25 of the switching unit 19 is likewise in the blocked position whereas the other two on-off valves 25' are in the throughflow position. All-wheel steering is thereby made possible by by-passing the first steering control unit 15 and the first switching unit 16.

In the following embodiments, the components thereof corresponding to those of the first embodiment are provided with the same reference numerals and additional description is deemed unnecessary.

Figure 3:
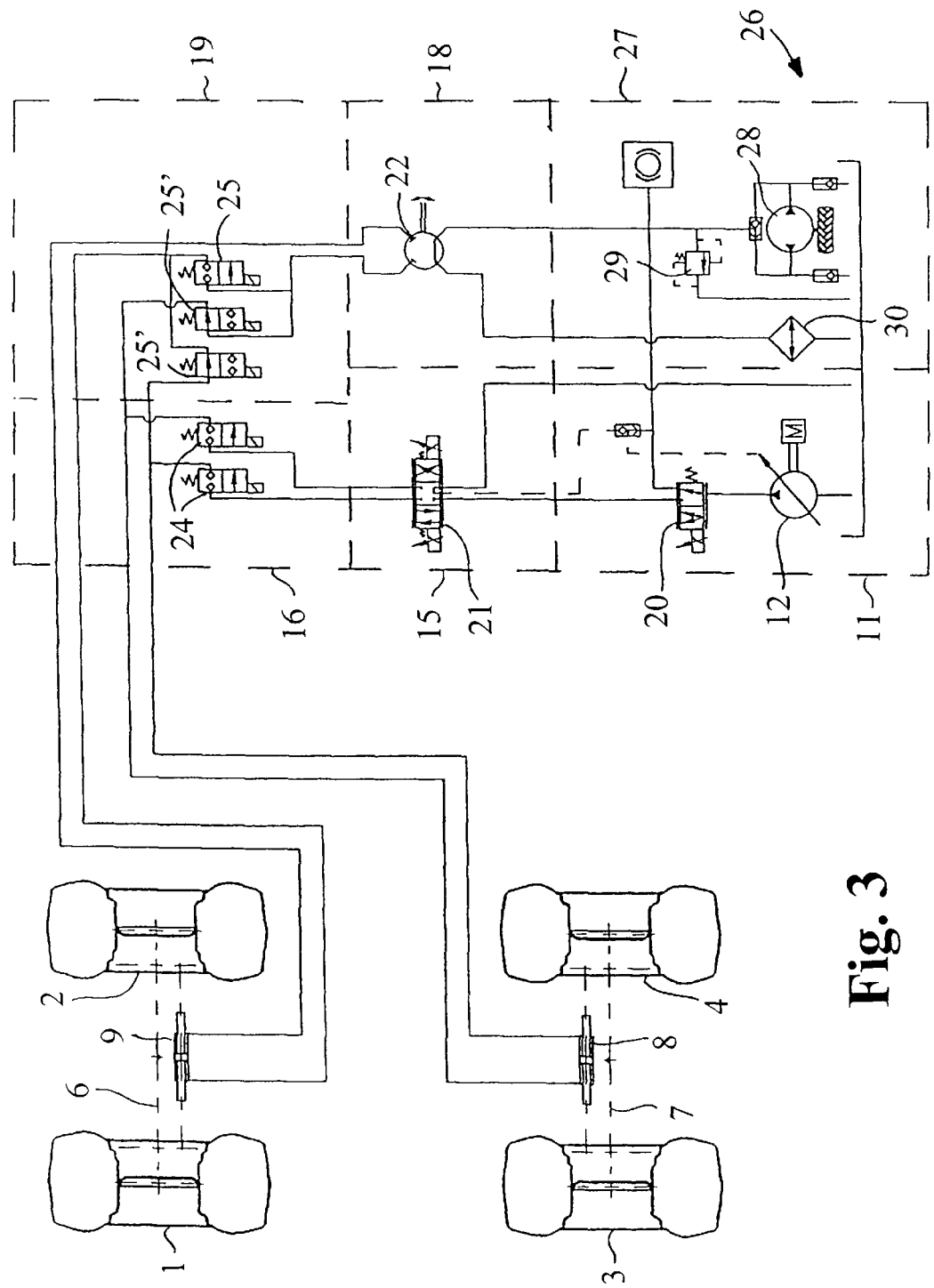
FIG. 3 is a schematic of a second embodiment of a steering device in the event of a fault.

In accordance with the second embodiment of FIG. 3, the second hydraulic circuit 26 can be connected to a second supply unit 27. This supply unit 27 comprises a back-up steering pump 28 which is driven by a not-illustrated part of the drive train that is fixed to the wheels of the working machine. The emergency steering pump 28 is preferably constructed as a fixed displacement pump which, in the form of a gear pump for example, has a flow rate that is dependent on the speed. The emergency pump 28 can operate in two directions and is protected against overload by a pressure limiting valve 29. Since the fluid in the second hydraulic circuit 26 is conveyed by the emergency steering pump 28 without any interruption in the event of a fault, a radiator 30 is provided for cooling the fluid.

If, for example, a fault should occur such that the first hydraulic pump 12 is no longer functional, the steering device automatically switches into its default state. In this state, the on-off valves 24, 25, 25' of the steering units 16 and 19 are switched in correspondence with the first embodiment of FIG. 1 and FIG. 2, so that the fluid is now delivered or made available by the emergency steering pump 28 and is supplied successively to the steering cylinders 8 and 9 via the hydraulic device 22.

The control valve 20 is controlled electromagnetically in such a manner that, at low speeds of travel at which the emergency steering pump 28 cannot produce the volume of flow required for steering the front axle 6, a partial fluid stream will be diverted from the first hydraulic circuit 13 to the hydraulic device 22. A constant stream of fluid is thus applied to the hydraulic device 22. The hydraulic pump 12 can be set to the necessary operating pressure or flow volume by means of load status lines 36 and shuttle valves 37.

Figure 4:
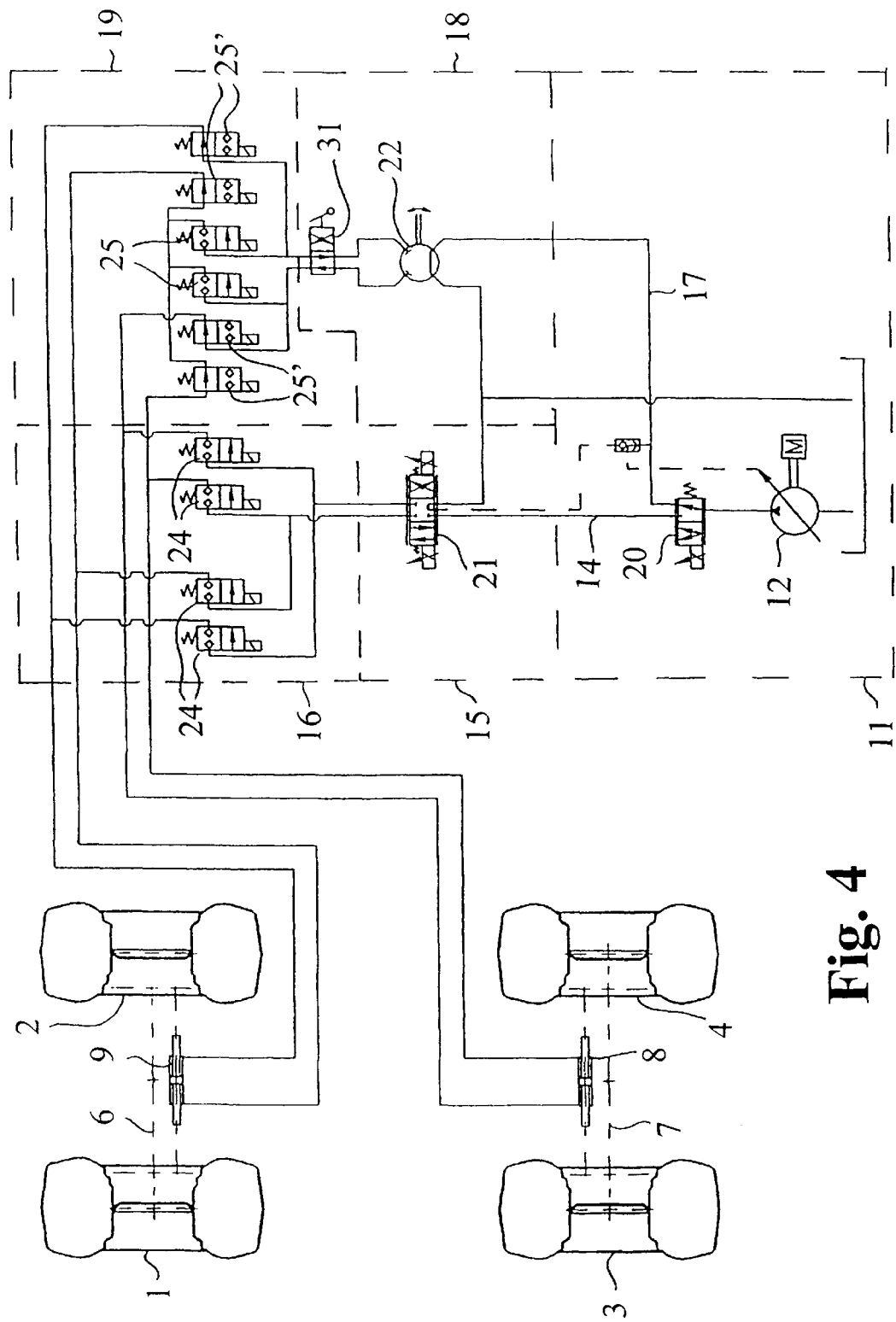
FIG. 4 is a schematic of a third embodiment of a steering device in the event of a fault.

FIG. 4 shows a third embodiment of the steering device which, in contrast to the first embodiment of FIG. 1 and FIG. 2, comprises modified switching units 16 and 19. The switching units 16 and 19 each comprise twice the number of on-off valves 24 and 25, 25' so that the fluid-conveying lines 14 and 17 can be associated with different steering cylinders 8 and 9. This steering device is suitable for machines having two main directions of travel so that, for example, the front axle 6 can be moved by means of the second steering control unit 18. A steering sense valve 31 is provided for this purpose, this valve always linking the second fluid-conveying line 17 to the front steering cylinder 9 even when the operator's cab is rotated through 180°. The front axle 6 is, in this manner, always controlled by the hydraulic steering control unit 18 and the back axle 7 by the electro-hydraulic steering control unit 15.

Figure 5:
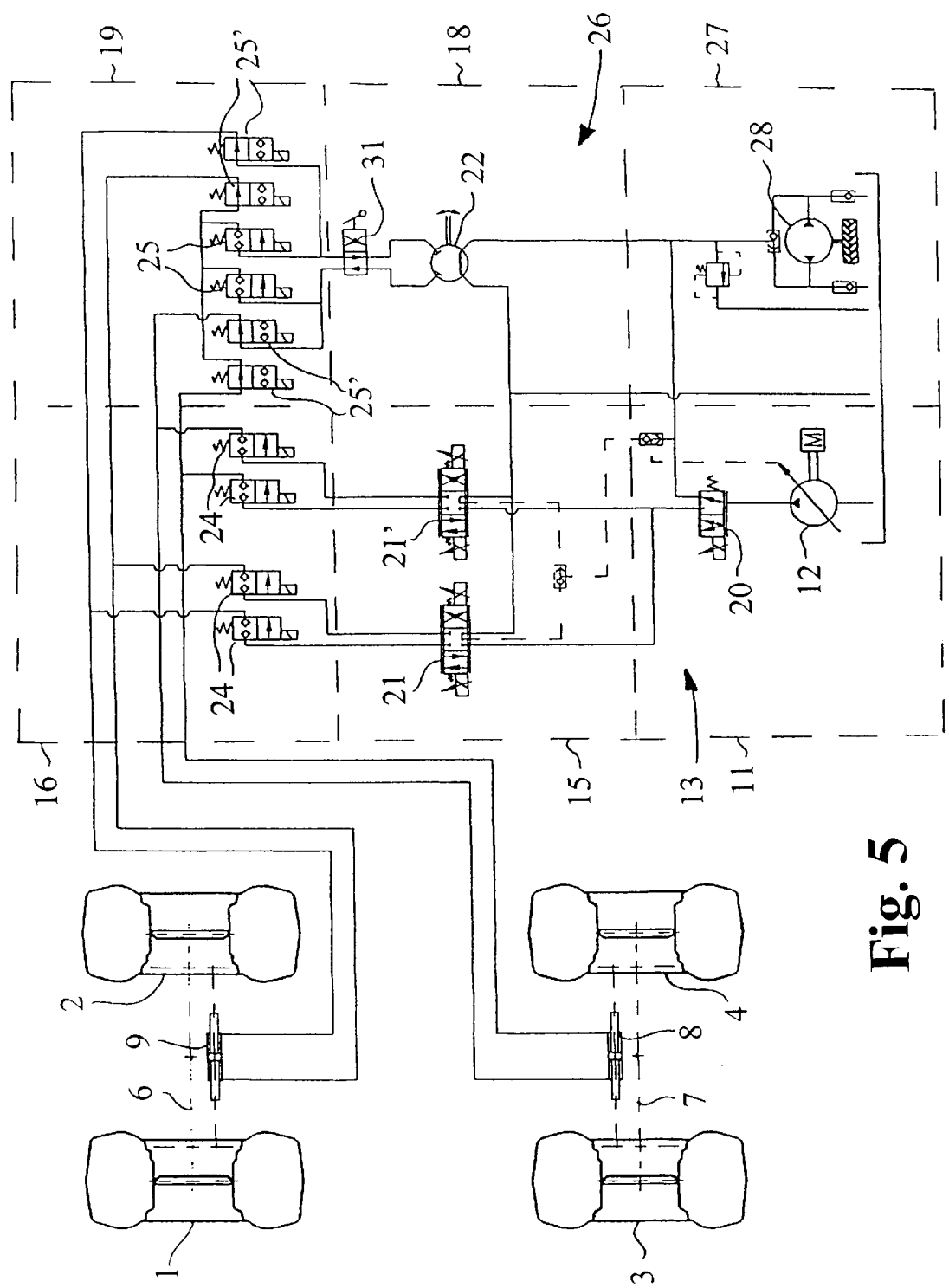
FIG. 5 is a schematic of a fourth embodiment of a steering device in the event of a fault.

In another embodiment in accordance with FIG. 5, the emergency steering pump 28 is associated with the second hydraulic circuit 26 on the one hand, and a first steering control unit 15 consisting of two parallel valves, 21 and 21', is associated with the first hydraulic circuit 13. This embodiment allows the steering cylinders 8 and 9 to be controlled by a respective proportional valve 21, 21'. The steering cylinders 8 and 9 are controllable separately by the respective proportional valves 21 and 21' which are each in the form of a 4/3 port valve. In the default state assumed in FIG. 5, the steering cylinders 8 and 9 are actuated under the influence of the hydraulic device 22. In this embodiment, the axles 6 and 7 can be controlled simultaneously via a respective control valve 21, 21'.

Figure 6:
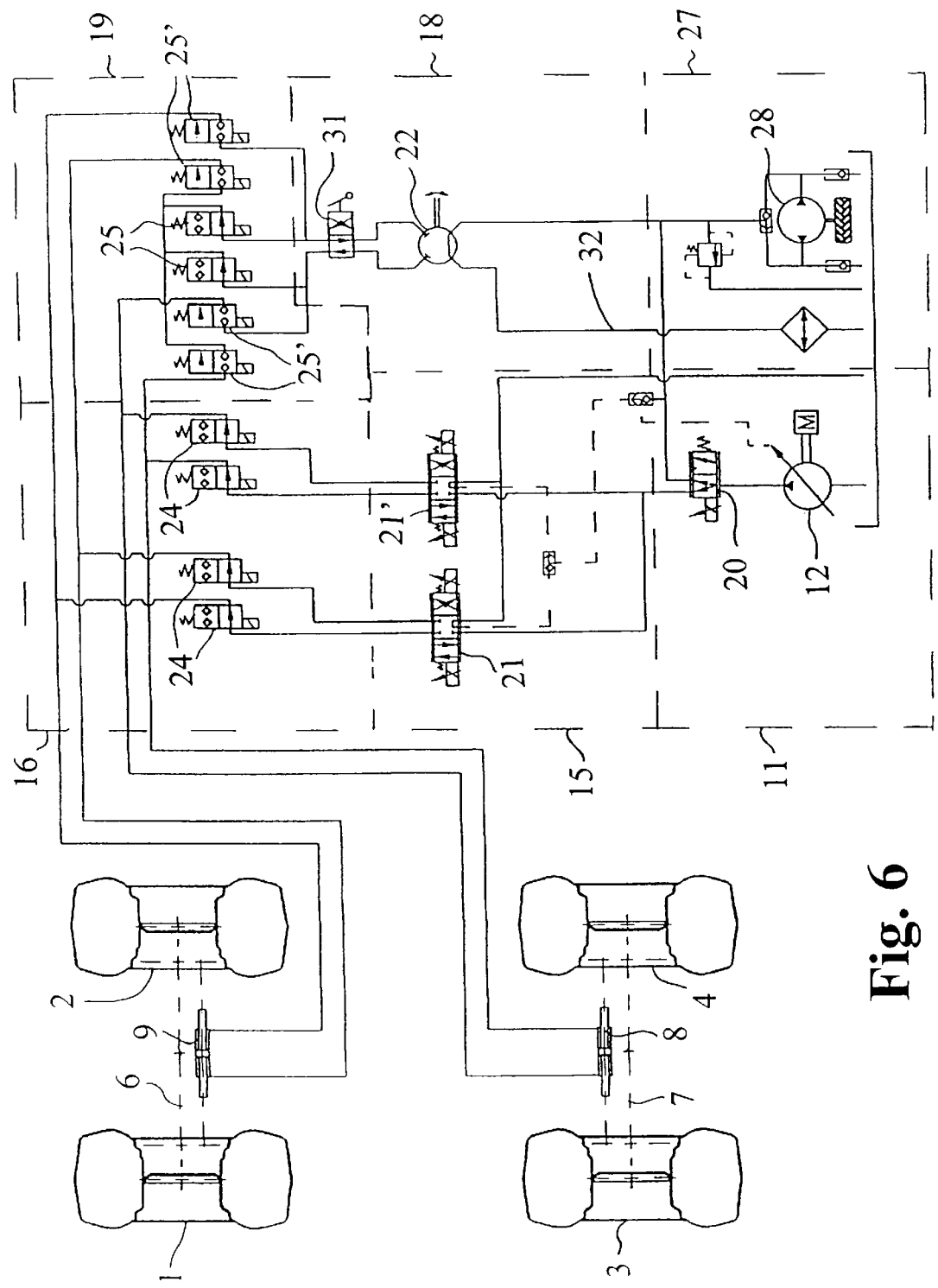
FIG. 6 is a schematic of a fifth embodiment of a steering device in the normal operational state.

In the fifth embodiment of FIG. 6, two proportional valves 21, 21' for controlling the axles 6 and 7 in the normal operational state are provided as in the preceding embodiment. In the operational state illustrated, the on-off valves 25, 25' are operated such that the fluid flows back directly to the hydraulic device 22, by-passing the steering cylinders 8, 9. The hydraulic device 22 is thus semi-short-circuited and the stream of fluid displaced by the hydraulic device 22 thus has no effect on the deflection of the wheels 1, 2, 3, 4. As a result, a load moment will be produced on the steering wheel operatively connected to the hydraulic device 22, this moment corresponding to that occurring when the steering cylinders 8 and 9 are being controlled by actuating the hydraulic device 22. The steering wheel can thus be employed as a means for generating a preferred steering-angle-value so that the operator of the machine will get the same feeling for the steering action. For this purpose, the steering wheel is operatively coupled to an electrical shaft encoder. The shaft encoder may be in the form of an incremental encoder and be arranged on the steering shaft. The preferred value generated in this manner controls the proportional valves 21, 21, using a steering program in correspondence with the characteristic curve illustrated in FIG. 1. In this embodiment, a return fluid-conveying line 32 is provided for the hydraulic device 22, which is directly connected to the tank.

Figure 7:
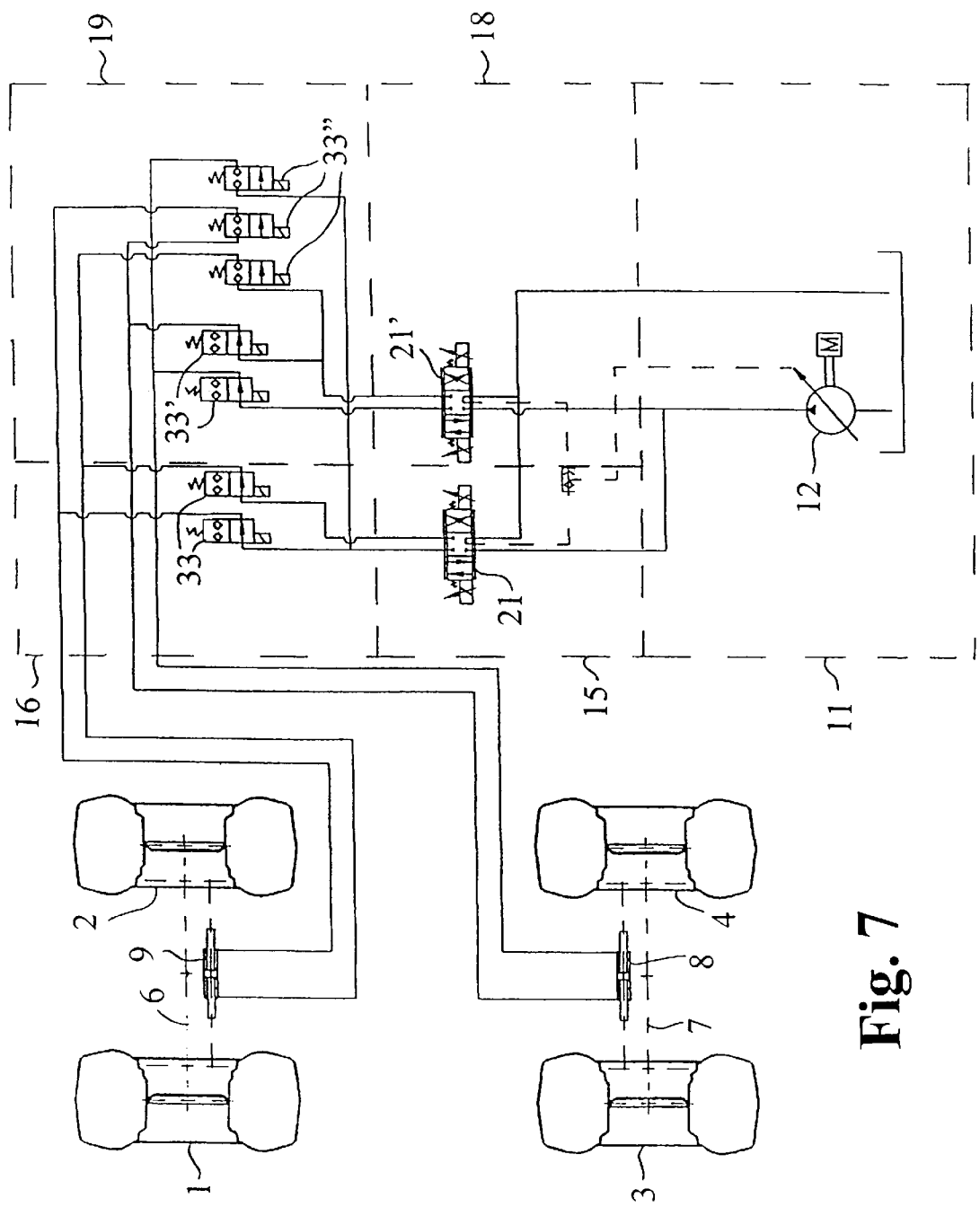
FIG. 7 is a schematic of a sixth embodiment of a steering device in the normal operational state.

In the sixth embodiment of the invention in accordance with FIG. 7, and in contrast to the first embodiment of FIGS. 1 and 2, the second steering control unit 18 consists of a control valve 21' which has the same construction as the control valve 21 contained in the first steering control unit 15. The control valves 21, 21' are supplied via the hydraulic pump 12. In the default state, the respective paired on-off valves 33 and 33' of the first switching unit 16 and the second switching unit 19 are switched into the blocked position. The three further on-off valves 33" of the second switching unit 19 automatically switch into a position in which, in dependence on the operation of a control valve 21 or 21', fluid is applied successively to the series connected steering cylinders 8, 9 in the manner described above.

Figure 8:
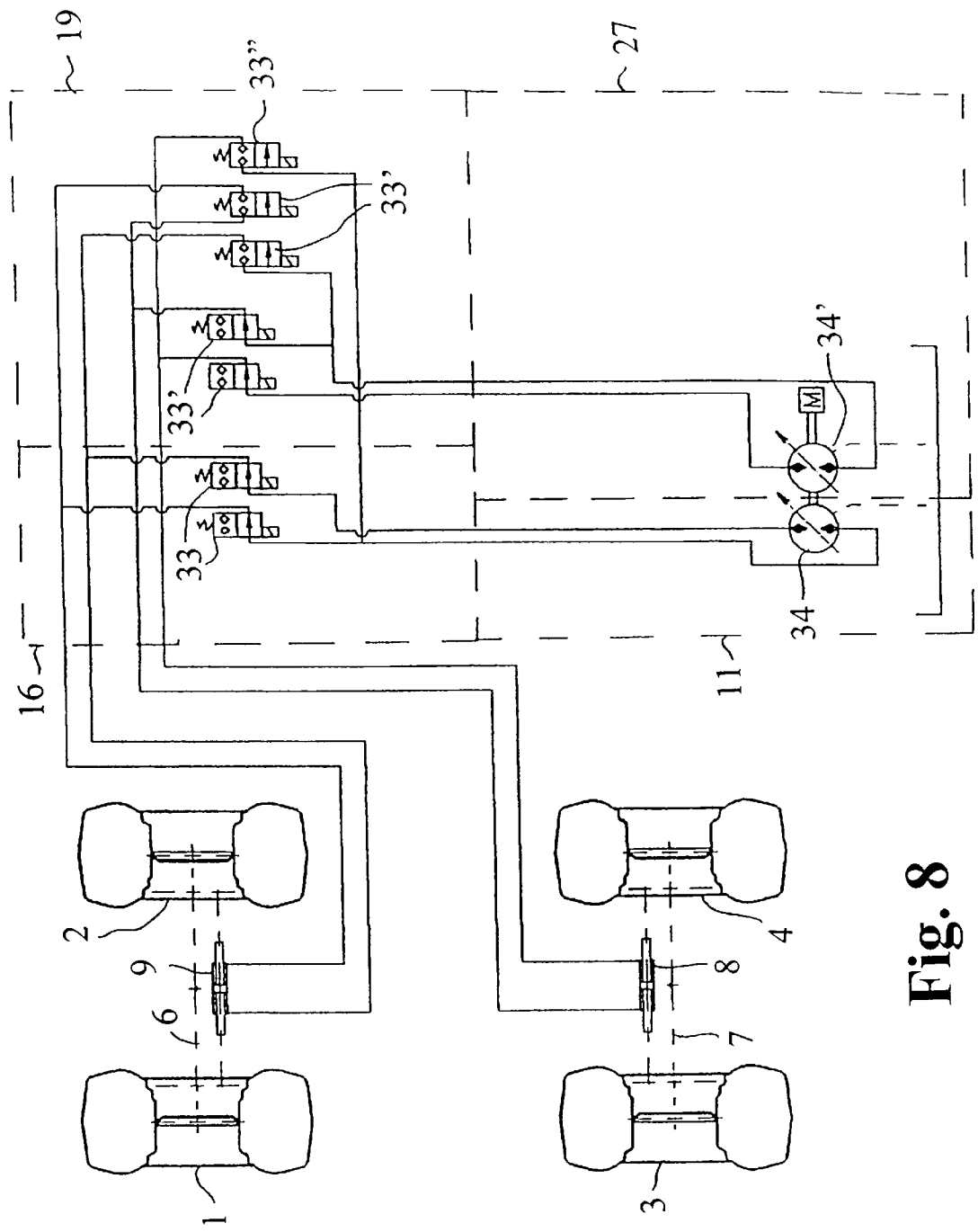
FIG. 8 is a schematic of a seventh embodiment of a steering device in the normal operational state.

In a seventh embodiment in accordance with FIG. 8, the switching units 16 and 19 described in the preceding embodiment are directly connected to a respective variable displacement pump 34 and 34'. The variable displacement pumps 34, 34' can be controlled in proportional manner and allow the steering cylinders 8, 9 to be controlled independently of one another. In the event of damage i.e. in the default state, the steering action can, in correspondence with the preceding embodiments, be maintained by means of a single one of the variable displacement pumps 34 or 34' whereby the fluid is supplied from the relevant variable displacement pump 34, 34' via the control valves 33', 33" to the steering cylinders 8, 9.

The invention in its broader aspects is not limited to the several embodiments have been illustrated and described, but departures therefrom can be made within the scope of the accompanying claims and without departing from the principles of the invention and without sacrificing its chief advantages.

I claim:

1. A steering device for self-propelled working machines having steerable wheels including: at least one steering cylinder associated with at least one pair of wheels, at least one valve unit for controlling the flow of a fluid to the at least one steering cylinder, a supply unit comprising a control valve connected to an output of a hydraulic pump operatively connected to at least one flow control valve of a first steering control unit and to a hydraulic device of a second steering control unit that is operatively connected to the at least one valve unit to provide a flow of the fluid thereto; the first steering control unit and the second steering control unit the at least one valve unit each include a respective switching unit incorporating at least one on-off valve of each steering control unit being automatically switchable in the event of a fault in a manner such that the at least one steering cylinder may be controlled by the second steering control unit providing all wheel steering by by-passing the first steering control unit and the respective switching unit.

2. The steering device in accordance with claim 1, including a plurality of steering cylinders, and means for operating the at least in on-off valve of the first and the second steering control units in the event of a fault so that the steering cylinders are connected in series and the fluid is supplied thereto in succession.

3. The steering device in accordance with claim 1, wherein each respective switching units of each respective first and second steering control unit is arranged between the associated steering control unit and the at least one steering cylinder associated therewith.

4. The steering device in accordance with claim 1, including a plurality of steering cylinders, and wherein the second steering control unit includes the hydraulic device which is associated with the respective switching unit applied to the plurality of steering cylinders in the event of a fault.

5. A steering device in accordance with claim 4, including a wheel driven back-up steering pump operatively coupled to the second steering control unit including the hydraulic device.

6. A steering device in accordance with claim 4, wherein the control valve of the supply unit can be controlled in a manner such that a partial stream of fluid can be supplied from a first hydraulic circuit to a second hydraulic circuit to which a back-up pump is applied so that a constant supply stream is always made available to the second steering control unit.

7. The steering device in accordance with claim 4, wherein the flow control valve includes an electromagnetically actuatable proportional valve.

8. The steering device in accordance with claim 1, wherein the at least one switching unit of the first and the second steering control unit is directly connected to a respective variable displacement pump a least when in the normal operational state.

9. The steering device in accordance with claim 1, wherein each of the associated on-off valve includes directly operated seat valves.

10. The steering device in accordance with claim 1, wherein in the normal operational state, the at least one on-off valve of a second switching unit associated with the second steering control unit is switchable into a position such that the fluid supplied to the second switching unit me be conveyed solely to a second steering cylinder associated with a front axle in a direction of travel.

11. The steering device in accordance with claim 1, wherein in the event of a fault, the at least one on-off valve of a first switching unit associated with the first steering control unit is switched automatically into a blocking position.

12. The steering device in accordance with the claim 1, wherein each associated on-off valve is moved into a switching position associated with the default state with a return spring arrangement.

13. The steering device in accordance with claim 4, wherein in the normal operational state the at least one control valve is operated in a manner such that the fluid is fed back to the hydraulic device so that the at least one on-off valve associated with at least one flow control valve is opened.

14. The steering device in accordance with claim 4, wherein the hydraulic device is operatively connected to a steering wheel and to a mechanism that generates a preferred steering-valve which is used for controlling the first steering control unit.

15. The steering device in accordance with claim 4, wherein the at least one flow control valve is controllable in dependence on speed of travel of the self-propelled working machine.

16. A steering device in accordance with claim 4, wherein the hydraulic device is connected to a radiator in a manner such that the fluid being fed back is cooled to a constant operating temperature independently of the speed of travel.

17. A steering device for self-propelled working machines having steerable wheels includes: at least one steering cylinder associated with at least one pair of wheels, at least one valve unit for controlling the flow of a fluid to the at least one steering cylinder, a hydraulic pump operatively connected to at least one flow control valve that is operatively connected to the at least one valve unit to provide a flow of the fluid thereto; the at least one valve unit includes a respective switching unit incorporating at least one on-off valve associated with the at least one steering cylinder, the at least one on-off valve being automatically switchable in the event of a fault in a manner such that at least one steering cylinder may be controlled by a single steering control unit, wherein a steering sense valve is associated with a second steering control unit with the steering cylinder appertaining to a front axle in a direction to travel in dependence on positioning of an operator's cab.

* * * * *